Oct. 28, 1952     G. L. CLAYBOURN ET AL     2,615,775
OUTDOOR METAL-CLAD SWITCHGEAR
Filed Oct. 30, 1947     3 Sheets-Sheet 2
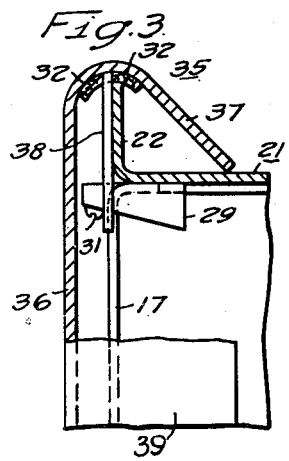
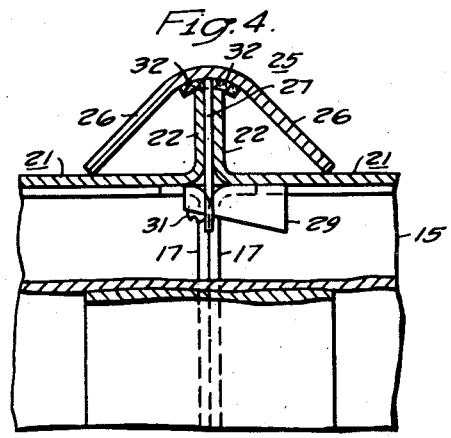
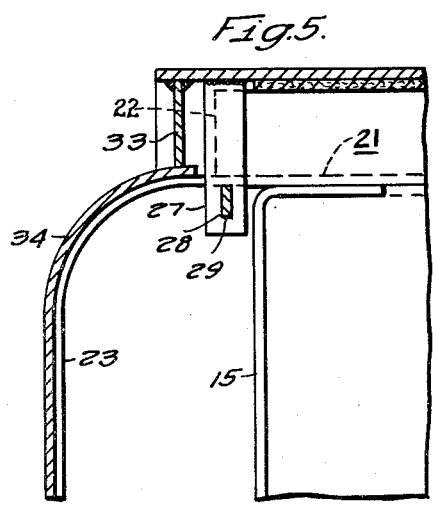
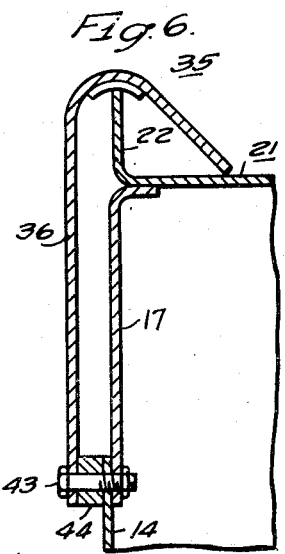
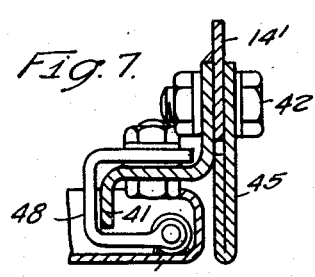
WITNESSES:
INVENTORS
Glen L. Claybourn
and Paul Kocsis, Jr.
BY
ATTORNEY Oct. 28, 1952  G. L. CLAYBOURN ET AL  2,615,775
OUTDOOR METAL-CLAD SWITCHGEAR
Filed Oct. 30, 1947  3 Sheets-Sheet 3
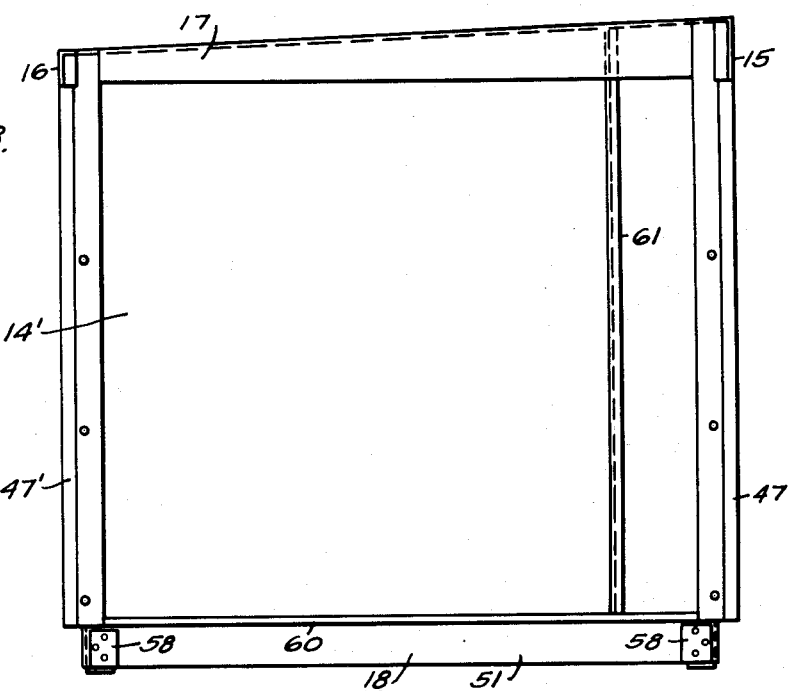
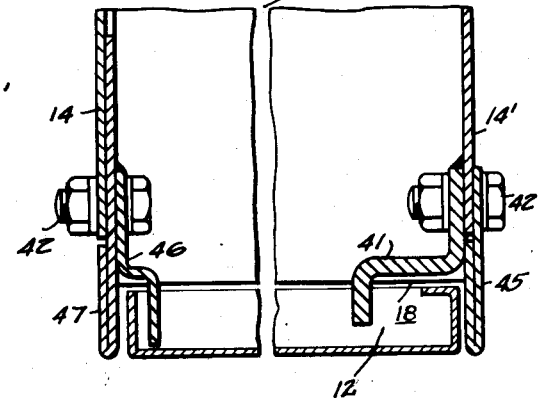
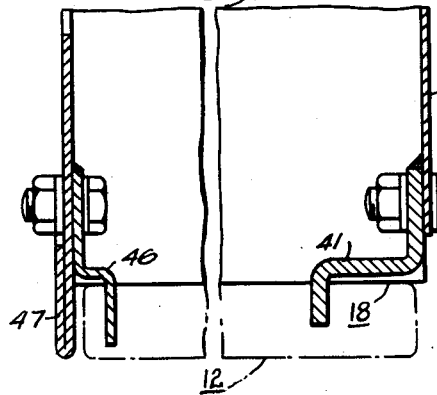
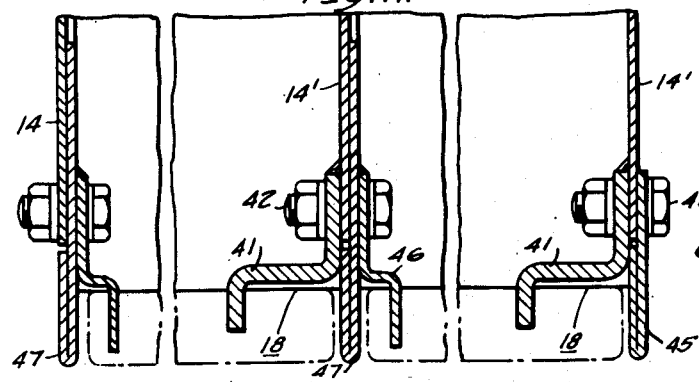
INVENTORS
Glen L. Claybourn
and Paul Kocsis, Jr.
BY
L. M. Crawford
ATTORNEY Patented Oct. 28, 1952

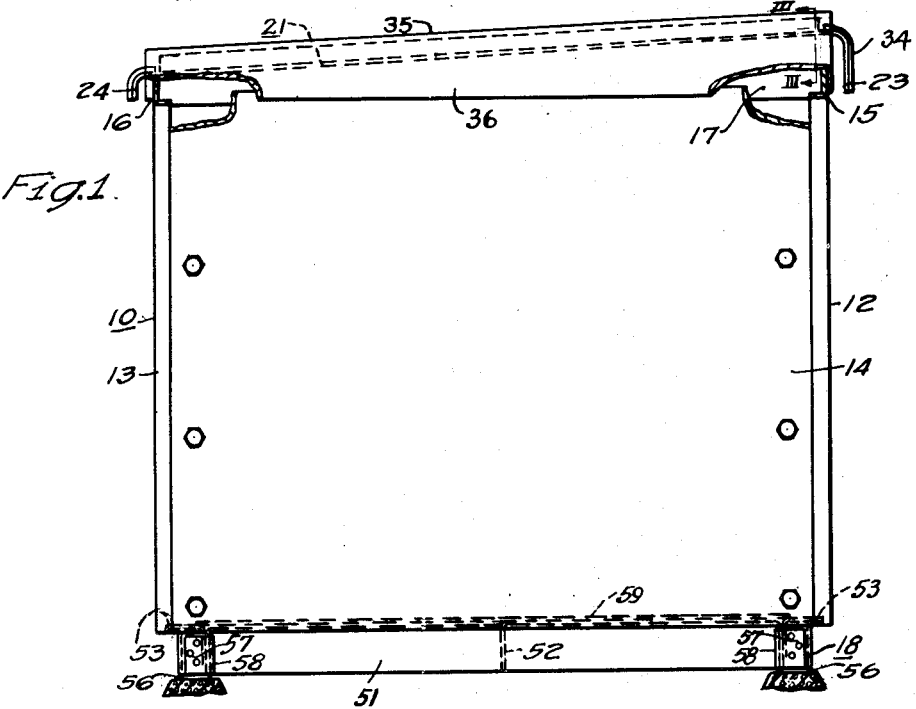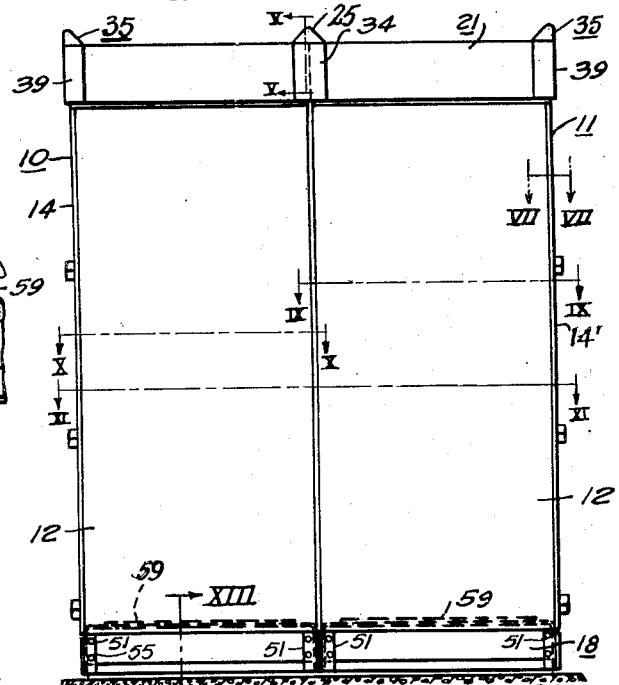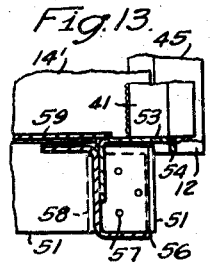

2,615,775

UNITED STATES PATENT OFFICE 2,615,775

OUTDOOR METAL-CLAD SWITCHGEAR

Glen L. Claybourn and Paul Kocsis, Jr., Pittsburgh, Pa., assignors to Westinghouse Electric Corporation, East Pittsburgh, Pa., a corporation of Pennsylvania Application October 30, 1947, Serial No. 783,170

5 Claims. (Cl. 312—107)

Our invention relates, generally, to metal-clad switchgear and, more particularly, to metal-clad switchgear of the enclosed unit type suitable for outdoor service.

This application is a continuation-in-part of our copending application, Serial No. 744,806, filed April 30, 1947, now Patent No. 2,554,240, of May 22, 1951, which is directed primarily to a roof structure for metal-clad switchgear.

An object of our invention, generally stated, is to provide metal-clad switchgear of the unit type which shall be simple and efficient in operation and which may be economically manufactured and installed.

A more specific object of our invention is to provide enclosed metal-clad switchgear which may be manufactured in standard units and assembled with any desired number of units joined together in side-by-side relation.

Another object of our invention is to provide for increasing or decreasing the number of units in a switchgear installation.

A further object of our invention is to provide a unitary base for supporting a metal-clad switchgear unit.

Other objects of our invention will be explained fully hereinafter or will be apparent to those skilled in the art.

In accordance with one embodiment of our invention, a basic metal-enclosed switchgear unit housing including the base and the roof structure is so constructed that it may be installed individually or with any desired number of units joined together in side-by-side relation. The number of units in a switchgear installation may be increased by adding additional units similar to the basic unit on either side of the basic unit.

For a better understanding of the nature and objects of our invention, reference may be had to the following detailed description, taken in conjunction with the accompanying drawings, in which:

Figure 1 is a view, in side elevation, of a metal-enclosed switchgear structure embodying the principal features of our invention, portions of the structure being broken away for clearness;

Fig. 2 is a view, in front elevation, of the structure shown in Figure 1;

Fig. 3 is an enlarged detail view, partly in section and partly in elevation, of the upper left hand portion of the structure shown in Fig. 2, taken generally along the line III—III of Fig. 1.

Fig. 4 is a view, similar to Fig. 3, of the upper center portion of the structure shown in Fig. 2;

Fig. 5 is an enlarged detail view, partly in section, taken generally along the line V—V of Fig. 2;

Fig. 6 is a view, similar to Fig. 3, showing a modification of the invention;

Fig. 7 is an enlarged view, in section, taken along the line VII—VII of Fig. 2;

Fig. 8 is a view, similar to Figure 1, portions of the structure being removed;

Fig. 9 is an enlarged view, in section, of the front portion of one of the basic units of metal-enclosed switchgear;

Fig. 10 is an enlarged view, in section, of the front portion of one of the units suitable for adding to a basic unit;

Fig. 11 is an enlarged view, in section, of a portion of two units joined together;

Fig. 12 is an enlarged detail view of one corner of the structure shown in Fig. 2, portions being broken away for clearness, and Fig. 13 is an enlarged view, in section, taken along the line XIII—XIII of Fig. 2.

Referring to the drawings and particularly to Figs. 1 and 2, the structure shown therein comprises a pair of metal-clad switchgear unit housings 10 and 11 which are disposed in side-by-side relation. The units are of the type which is suitable for outdoor service, the switchgear apparatus being enclosed in sheet metal housings.

As shown, each housing may be provided with a hinged door 12 at the front and a similar door 13 at the rear. The main portion of the housings may be constructed by mounting side plates 14 and 14' and the doors 12 and 13 on a metal framework, which will be described more fully hereinafter.

Channel members 15 and 16 may be provided above the doors 12 and 13, respectively. Angle members 17 may also be provided above the side plates 14 and 14'. The entire structure may be mounted upon a suitable base 18, which will be described more fully hereinafter.

In order to protect the apparatus within the housings against the elements and, at the same time, make it possible to readily add additional units to the assembly when desired, we have devised the roof structure herein described and illustrated. As shown most clearly in Figs. 3, 4 and 6, the roof structure comprises a metal roof sheet 21 for each housing unit. The sides of each roof sheet 21 are bent at right angles to and upwardly from the roof surface to form upstanding flanges 22.

As shown in Figs. 1 and 5, the ends of each roof sheet 21 extend beyond the unit enclosure at both the front and the rear of the housing and are bent downwardly to provide drip edge extensions 23 and 24 at the front and the rear of the housing, respectively. The roof sheets may be made removable by spot welding studs (not shown) to the under side at locations which permit bolting the sheets down to holding lugs inside the housings, or they may be secured in any other suitable manner.

As shown in Fig. 4, the seam between the flanges 22 on adjacent units may be sealed by an angle-shaped metal plate 25 having legs 26 of equal length. The sealing plate 25 may be retained in position by tongue plates 27 which are secured to the sealing plate 25 and are disposed between the flanges 22.

The tongue plates 27 extend below the bottom surfaces of the roof sheets 21 and are provided with slots 28 (see Fig. 5) through which wedges 29 are driven. A screw 31 may be inserted in each wedge 29, as shown in Figs. 3 and 4, to retain the wedges in position. Strips of felt 32, or similar material, may be cemented on the under side of the sealing plate 25 on each side of the tongue plates 27 to close the joint between the flanges 22 and the sealing plate 25.

It will be seen that the upward extending flanges 22 effectively prevent moisture from seeping into the housing. The sealing plate 25 prevents wind-blown rain, snow or dirt from entering the housing through the joint between the two flanges.

As shown in Fig. 5, a baffle plate 33 may be provided at each end of the angle-shaped plate 25 to close the ends of the sealing plate. The opening between the downwardly bent ends of adjacent roof sheets 21 may be closed by a formed sheet metal cover strip 34 which may be bolted to the drip edge of the roof sheets and extends under the lower edge of the end baffle plates 33. The baffle plates 33 may be welded to the inside of the angle-shaped sealing plate 25. The shape and contour of the sealing plate is maintained by the baffle plates which are cut to fit inside of the sealing plate.

As shown most clearly in Fig. 3, the outside flanges 22 of the roof sheets may be covered by trim plates 35. The trim plates 35 are also angular in shape, but, as shown, one leg 36 is considerably longer than the other leg 37. The outside leg 36 extends down over the angle 17 of the housing.

Each trim plate 35 may be retained in position in a manner similar to the sealing plate 25. Tongue plates 38 are secured to the trim plate and are disposed adjacent the outside flange 22. The wedges 29 may be driven through the slotted tongue plates 38 underneath the surface of the roof sheet 21, thereby holding the trim plate in position. The felt strips 32 may be provided for sealing the joint between the trim plate 35 and the upper edge of the flange 22. As shown in Fig. 2, cover plates 39 may be provided for the ends of the trim plates 35. The cover plates 39 may be held in position in the same manner as the cover plates 34.

As shown in Fig. 7, the joint at one edge of the door 12 may be quite effectively sealed by a Z bar 41 which is welded to the side plate 14'. A trim strip 45 may be bolted in position on the side plate 14' by bolts 42. As shown in Fig. 9, the joint at the other edge of the door 12 may be sealed by a Z bar 46 which is welded to a trim strip 47 to which the side plate 14 may be removably attached by bolts 42. The door 12 may be hinged to the Z bar 41 by hinges 48, as shown in Fig. 7.

In the modification of the invention shown in Fig. 6, the tongue plates 38 and the wedges 29 are omitted, and the leg 36 of the trim plate 35 is bolted to the side plate 14 of the housing by bolts 43. A combined spacing and sealing strip 44 may be disposed between the leg 36 and the side plate 14. The strip 44 may be secured in position by the bolts 43.

It will be seen that, if desired, a roof sheet may be replaced by another sheet having bushings therein for making electrical connections to apparatus within a housing. Furthermore, the removal of a unit or the installation of additional units to the complete assembly may be readily done at any time. The joint between the old units and the additional units may be sealed in the manner herein described. Also, since the trim and the sealing plates are held in position by means of wedges, it is not necessary to provide holes through the roof members or the trim and sealing plates to secure them in position.

In order to facilitate the manufacture and the assembly of the complete housing units, and also to make it possible to readily add additional units to a switchgear installation, each housing unit is provided with the base 18 which is of a unitary construction. As shown most clearly in Figs. 1, 2, 12 and 13, each base comprises side members 51 which are formed from sheet steel into an angle shape, a cross member 52 which is also of an angle shape and is disposed substantially midway between the ends of the side members 51, and end cross members 53 which are of an angle shape having a depending flange 54 on one leg of the angle. The side and cross members may be welded together to form an integral unit.

As shown in Figs. 2 and 12, the ends of the side members 51 may be bent inwardly and provided with holes 55 which may be utilized to attach a cover strip (not shown). The depending flanges 54 function as jambs for the bottoms of the doors 12 and 13. Also, they may be utilized for retaining a circuit breaker transfer dolly in position when the circuit breaker is being placed in the housing.

As shown most clearly in Figs. 1 and 13, the base is supported on suitable foundation members by means of Z bars 56, one of which is provided at each end of the base. The Z bars may be welded to the side members 51 and to the cross members 53. As shown, the bottom flange of each Z bar extends below the side members 51, thereby providing a slight amount of clearance between the side members and the foundation members.

If desired, the Z bars may be made from stainless steel or other non-corrosive material, thereby preventing rusting by contact with moisture-retaining materials. The rusting or corroding of the base members may be still further retarded by coating the under side of the base with an asphalt material.

As shown in Figs. 1 and 13, holes 57 are provided in the side members 51 near each end to permit adjacent bases to be bolted together. Reinforcing pads 58 which are provided with holes in alignment with the holes 57 may be welded to the side members to strengthen the structure. A bottom cover plate 59 may be welded to the side members 51. A filler strip 60 (see Fig. 8) may be welded on the left-hand side member 51 in the space between the bottoms of the trim strips 47 and 47'.

As shown most clearly in Figs. 8 to 11, the framework for the housing comprises the vertically disposed Z bars 41 and 46 which may be welded to the right and the left front corners, respectively, of the base 18 and similar Z bars (not shown) which may be welded to the rear corners of the base. The cross members 15 and 16 may be welded to the Z bars at the front and the rear, respectively. The angle members 17 may be welded to the cross members 15 and 16. Angle bars 61 may be welded in the structure at desired locations and utilized for mounting apparatus within the housing.

In order to simplify and reduce the cost of each unit and also to make it possible to add additional units to the original switchgear installation, the first or basic unit of an installation is provided with the removable left-hand side sheet 14 and the fixed right-hand side sheet 14'. The right-hand side sheet 14' may be welded to the base members as well as to the Z bars 41. The removable left-hand side sheet 14 is attached to the trim strips 47 at the front and 47' at the rear by bolts 42. The trim strips 47 and 47' at the rear welded to the base members and to the Z bars 46. The trim strips 45 are attached to the fixed side sheet 14' by bolts 42.

As shown in Fig. 9, the first or basic unit comprises a base 18, a fixed side sheet 14', a removable side sheet 14, the Z bars 41 and 46 and the trim strips 45 and 47. As shown in Fig. 10, each unit which is to be added to an original unit or units comprises a fixed side sheet 14', Z bars 41 and 46, the trim strips 47 and the base 18.

If the additional unit is added on the left of the basic unit, as shown in Fig. 11, the side sheet 14 is first removed from the basic unit and the additional unit bolted into position on the left-hand side of the basic unit. The removable side sheet 14 is then installed in position on the left-hand side of the additional unit, thereby completing the enclosure. The additional roof structure may be added in the manner hereinbefore described.

If the additional unit is to be installed on the right-hand side of the basic unit, this may be done by removing the trim strips 45 from the right-hand side of the unit, then bolting the additional unit onto the right-hand side of the basic unit and installing the trim strips 45 on the right-hand side of the added unit, thereby completing the structure as shown in Fig. 11.

Thus, it will be seen that only one removable side sheet 14 is required for a complete installation, regardless of the number of units therein. However, the apparatus in each unit is completely isolated from the apparatus in the adjacent units, since a fixed side sheet 14' is provided between adjacent units. Accordingly, considerable material may be saved without sacrificing any of the protective features of metal-enclosed switchgear.

From the foregoing description, it is apparent that we have provided metal-enclosed switchgear housings which may be manufactured and assembled in standardized units which are so constructed that any desired number of units may be assembled together in a switchgear installation, and additional units may be added as desired. The construction is such that a minimum amount of material is required, thereby reducing the cost of the apparatus.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. A metal-enclosed switchgear housing unit comprising, a unitary rectangular base of formed metal side and cross members welded together, an upright Z member welded to said base at each corner thereof, each Z member having substantially parallel flanges, a side sheet removably attached to the upright members at one side of the base, another side sheet secured to the upright members at the opposite side of the base, a trim strip attached to each upright member and having a folded-back portion disposed in alinement with the side sheet on the upright member and spaced from one of the flanges of the upright member, a hinged door at the front and the rear of the unit, flanges on each door disposed in the space between the flanges of the upright Z members and their associated trim strip, and a metal roof supported by the upright members.

2. A metal-enclosed switchgear housing unit comprising, a unitary rectangular base of metal side and cross members welded together, a vertically disposed Z bar welded to the base at each corner thereof, each Z bar having substantially parallel flanges, a side sheet removably attached to the Z bars at one side of the base, another side sheet welded to the Z bars at the opposite side of the base, a trim strip attached to each Z bar and having a folded-back portion disposed in alinement with the side sheet on the Z bar and spaced from one of the flanges of the Z bar, a door hinged to a Z bar at the front of the unit, another door hinged to a Z bar at the rear of the unit, said doors having flanges thereon disposed in the space between the flanges of the Z bars and their associated trim strips, and a metal roof supported by the Z bars.

3. A plurality of adjacent switchgear housing units comprising, a unitary rectangular base for each unit, upright Z members welded to each base at its corners, each Z member having substantially parallel flanges, a side sheet welded to the upright members at one side of each base, another side sheet removably attached to the upright members at the outer side of one unit, a trim strip attached to each upright member and having a folded-back portion disposed in alinement with the side sheet on the upright member and spaced from one of the flanges of the upright member, a door at the front and the rear of each unit, flanges on each door disposed in the space between the flanges of the upright Z members and their associated trim strip, a metal roof sheet for each unit, sealing plates for the seams between adjacent roof sheets, and fastening means for connecting adjacent units together.

4. A plurality of adjacent switchgear housing units comprising, a unitary rectangular base for each unit, upright Z members secured to each base at its corners, each Z member having substantially parallel flanges, a side sheet secured to the upright members at one side of each base, another side sheet removably attached to the upright members at the outer side of one unit, a trim strip attached to each upright member and having a folded-back portion disposed in alinement with the side sheet on the upright member and spaced from one of the flanges of the upright member, a door at the front and the rear of each unit, each door being hinged to an upright member, flanges on each door disposed in the space between the flanges of the upright Z members and their associated trim strips, a roof sheet for each unit, sealing plates for the seams between adjacent roof sheets, and removable means for fastening adjacent units together.

5. A plurality of adjacent switchgear housing units comprising, a unitary base for each unit, upright members secured to each base at the corners thereof, a side sheet secured to the upright members at one side of each base, another side sheet removably attached to the upright members at the outer side of one unit, a roof sheet for each unit, each roof sheet having upstanding flanges at its sides, substantially right angle-shaped sealing plates for the seams between adjacent flanges, tongue plates on the sealing plates, said tongue plates being disposed between said flanges and extending below the undersurface of the roof sheets, wedges disposed in the tongue plates and engaging the undersurface of the roof sheets to retain the sealing plates in position, and fastening means for connecting adjacent units together.

GLEN L. CLAYBOURN.
PAUL KOCSIS, Jr.

REFERENCES CITED

The following references are of record in the file of this patent:

UNITED STATES PATENTS

| Number | Name | Date |
| --- | --- | --- |
| 782,135 | Hoult | Feb. 7, 1905 |
| 1,121,422 | Tydings | Dec. 15, 1914 |
| 1,450,180 | Jamison | Apr. 31, 1923 |
| 1,506,442 | O'Hara | Aug. 26, 1924 |
| 2,058,263 | Rosendale | Oct. 20, 1936 |
| 2,072,383 | Rottman | Mar. 2, 1937 |
| 2,196,399 | Rubel | Apr. 9, 1940 |
| 2,279,945 | Hoffman | Apr. 14, 1942 |